Aug. 20, 1957 M. MAUL 2,803,190

RECORD CARD CONTROLLED RECORDING MACHINES

Filed Nov. 30, 1953 2 Sheets-Sheet 1

Inventor:
Michael Maul
BY:

Inventor:
Michael Maul
BY:

United States Patent Office 2,803,190

Patented Aug. 20, 1957

2,803,190

RECORD CARD CONTROLLED RECORDING MACHINES

Michael Maul, Schwabach, near Nurnberg, Germany

Application November 30, 1953, Serial No. 395,250

Claims priority, application Germany December 6, 1952

10 Claims. (Cl. 101—93)

Record card controlled recording machines are known in various constructions. Recording devices controlled by record cards may be provided as printing mechanisms, accumulating mechanisms, punching mechanisms or in other ways. Generally, the record cards comprise designation or group indexes (such as group numbers) and indexes associated therewith which are different for each card (such as quantity and amount), said indexes being termed hereafter amount indexes. In recording machines controlled by record cards with group indexes and amount indexes in which the analyzers for the indexes are in operative controlling connection with the recording places of the recording mechanism it is also known to change the operative connections between the analyzers for the indexes and the recording places by a rearranging device being under control of the record cards. This rearranging is effected in the known machines under the control of a special controlling hole of the cards.

The essential feature of the present invention now consists in that the rearranging device is under the supervision of the group control device being controlled by the analyzers of the group indexes, and that the rearrangement between the analyzers of the indexes and the recording places is effected for the duration of the analysis of the indexes of the last card of a group.

The provision according to the invention opens quite new possibilities in the art of punched card machinery. For it permits to deviate from the usual tabulating machine, the latter becoming not only very voluminous but also very complicated owing to the manifold co-operation of accumulating and printing mechanisms as well as of the associated controlling means. Instead of this single machine rather two separate smaller machines are employed each of which being also simpler. One of the machines is a summary card punch in which the items are accumulated by the accumulating mechanisms in a known manner and wherein for each group a total card is punched. The total cards are sorted between the groups of item cards. For recording of the items and totals only a table printer without accumulating mechanisms is necessary in which the cards are printed one after the other.

When applying the rearrangement according to the invention it is not necessary to provide the amounts in the total cards in the same perforation fields as in the item cards, which is advantageous because the totals require generally a larger number of card columns than the items do. Such a particularly favourable utilization of the cards of both kinds is accordingly enabled by the invention and moreover offers the advantage to provide the item and total entries in any arbitrary and differing columns of the recording sheet.

In such machines in which each column of the card is fed in motion past a single analyzer which analyzes all hole positions of a column one after the other, according to the invention there are three rows of analyzers provided one behind the other in the card feeding path. The last row of analyzers in the card feeding path is plugged through the rearranging device upon the recording places while the rows of analyzers preceding in the card feeding path (group control brushes) compare the two subsequent cards with each other through the group control device. Accordingly, by this manner it is attained that after the passage of two cards to be compared past the group control brushes, analysis of the index marks can be effected by the third row of analyzers, a "rearrangement" having taken place already before in due time. This provision of the analyzers is, however, not compulsory for the invention. For instance, in mechanical machines in which all hole positions are analyzed at the same time, for instance by a pin box, only two analyzing stations are required. If disagreement of the group numbers has been determined, displacement between the analyzers and the printing mechanisms is effected after the analysis, but before the setting of the printing mechanisms.

In order to permit using of the machine at will in a known manner also for the printing from groupwise sorted item cards (without interpolated total cards) and in this case to permit using of the group control for certain shifting operations (for instance spacing of the lines between the groups) a manually settable switching device for the manners of operation has been provided in the preferred embodiment. Said switching device permits the group control which is wired to the first and second row of brushes to be switched to the second and third row of brushes wherein, however, the last mentioned row remains wired to the recording places. This setting is also used if only summary cards (for instance groupwise sorted according to main group numbers) shall be printed from. The latter represent then merely a substitute for the item cards.

A preferred embodiment of the invention is diagrammatically shown in the accompanying drawings. Known devices are only symbolically indicated in this case.

Figure 1:
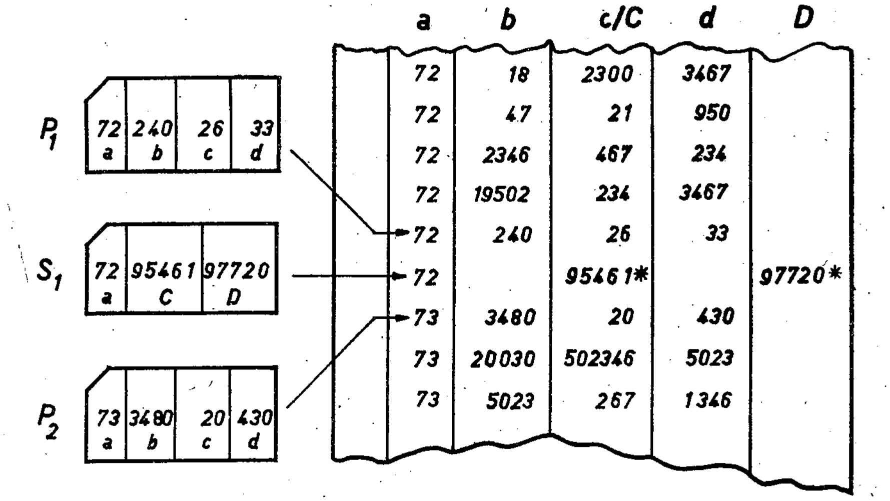
Fig. 1 shows some record cards, a recording list of the table printer as well as the association of the data of the record cards with the enterings in the table list. (For reasons of simplicity in the record cards there are shown instead of the perforations the numbers expressed by the latter.)

In Fig. 1 three record cards are indicated of which $P_1$ is the last card of a preceding item group $S_1$ the associated total card of this item group and $P_2$ the first item card of a following item group. The item cards of the various groups are divided in the same manner into the perforation fields *a*, *b*, *c*, *d*. The group perforations are indicated in the field *a* whereas in the fields *b*, *c* and *d* amount indexes, such as quantity of goods, amounts of money etc., are indicated. It has been assumed that the cards move in the sequence $P_1$, $S_1$, $P_2$ from the bottom to the top past analyzing brushes so that, accordingly, the cards are copied in the sequence $P_1$, $S_1$, $P_2$. Since the group designations are copied in rising sequence it follows that the data of these cards follow upon the record sheet one below the other, as is also indicated by the reference arrows in Fig. 1.

In the total card $S_1$ there is punched in the field *a* the same group number as in the field *a* of the item card $P_1$. In the indicated example it has further been assumed that the data of field *b* are of no interest for totalling. The data of the fields *c* and *d* of the item cards have, however, been accumulated in the summary card punch and the totals are punched into the respective fields C and D of the summary card $S_1$. All item cards are divided in the same manner as the item cards $P_1$ and $P_2$, and in a similar manner all total cards are divided in the same way as the total card $S_1$.

If now in the table printer the data of the cards are printed one after the other, for instance the grouping illustrated in Fig. 1 may be gained on the list by means of the rearranging device. In the column *a* of the list there are the group numbers and in the columns *b*, *c*, *d* the items corresponding to the perforation fields *b*, *c*, *d* of the cards. In the column *b* of the list there is no total indication since, as presupposed, the same is not required. In the column *c*/C of the record sheet there are one below the other at first the item data of the perforation fields *c*, but in the same column there is also printed the total indication C–95461 (of the group No. 72, showing in Fig. 1 only the last items), though these data had partly to be analyzed by entirely different analyzing brushes than the perforation field *c*. The recording places for the column *c*/C in the table printer are, accordingly, switched upon item printing to the analyzers of the perforation field *c* and during the analysis of the summary card $S_1$ they are switched to the analyzers of the perforation field C.

The data of the perforation fields *d* are recorded in the column *d* of the record sheet. In the indicated example, however, it has now been assumed that the total is not desired in the same column but in the column D of the record sheet adjacent to the right. Here, therefore, the following rearrangement between the analyzers and the recording places is effected: The analyzers of the perforation field *d* are connected to the recording places of the column *d* in the table printer during the analysis of the item cards. If, however, the group number changes, a rearrangement will be effected for the duration of the analysis of the last card of the group, during which the analyzers for the field D of the summary card are connected to the recording places of the column D of the table printer.

The totals may be indicated by an asterisk which can be printed upon each group change in a known manner.

Figure 2:
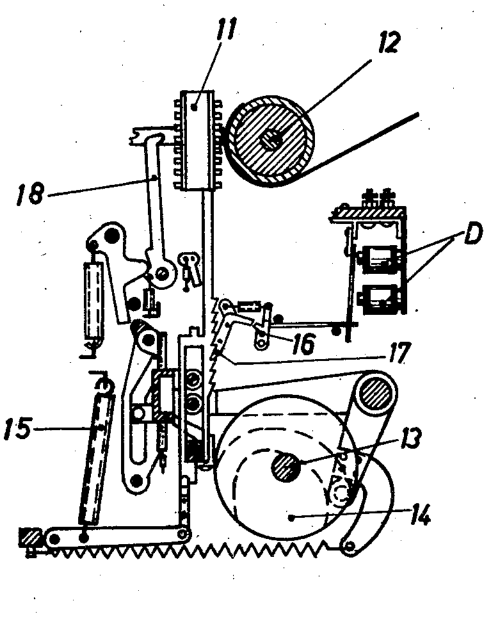
Fig. 2 shows a section through a known punched card controlled printing device that may be employed in a table printer.

Fig. 2 illustrates a printing mechanism which can be used as table printer. Since this printing mechanism is generally known and described in detail in numerous patent specifications, a brief reference to the manner of operation will be sufficient in this case in which only a single recording place is considered.

Synchronously with the passage of the cards past the analyzing brushes the type bar 11 is lifted opposite a printing roller seated upon a shaft 12. This lifting movement is effected by a shaft 13 through a cam 14 by means of a lifting mechanism which permits the type bars to be lifted upwardly through springs 15. Upon existence of a hole in a column a locking pawl 17 being normally held in locked position by a pawl 16 is released by the printing magnet D, said pawl 17 engaging at this moment the teeth of the type bar 11. The latter is prevented from further upward movement so that at the end of the stroke all type bars are set in accordance with the analyzed perforation. The adjusted type of each place is then impelled by the printing hammer 18 against the recording sheet running around the printing roller.

Figure 3:
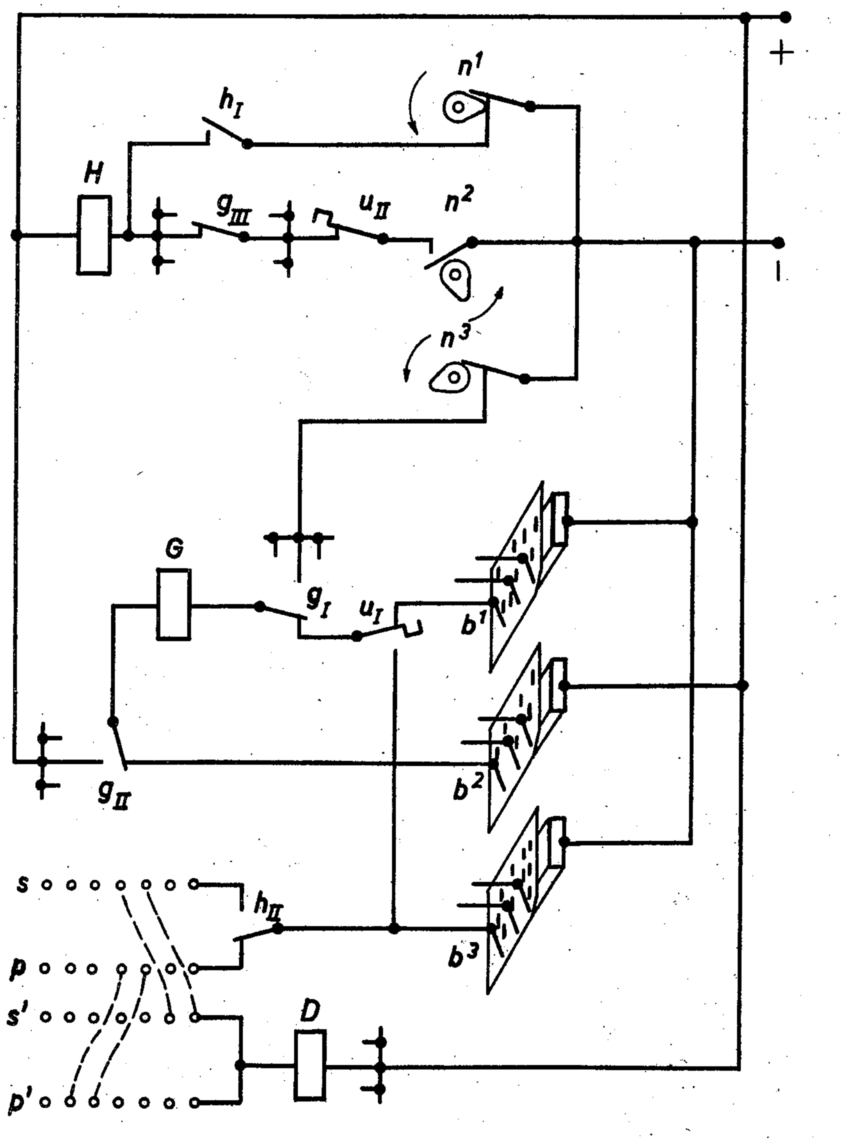
Fig. 3 shows the wiring diagram of the device according to the invention.

The wiring diagram with the rearranging device is shown in Fig. 3. For reasons of clarity the wiring has been shown for a single column only. If a plurality of switching elements are wired in parallel with each other, this is indicated by the distribution connections. The plug board has been indicated diagrammatically by the plug connections. The relays and magnets are indicated by capitals and the contacts which they actuate by the corresponding small letters.

The plug board is so arranged that each of the card columns or analyzing brushes $b^3$ is associated with a plug place *p* and *s* for controlling the recording places. In a respective manner there is a plug place *p'* and *s'* associated with each recording place. For reasons of clarity during plugging in the actual construction the plug points may be so arranged that the plug places *s* are close to *s'* and *p* close to *p'*. The association of analyzing brushes and recording places is then effected for the item cards between the plug places *p* and *p'*, for the total cards, however, between the plug places *s* and *s'*. In this case the association may be effected arbitrarily in any case without any mutual interference of the two associations.

The cards are fed in a known manner by rollers past the analyzing brushes $b^1$, $b^2$ and $b^3$ (in Fig. 3 in the direction from bottom to top). The brushes $b^1$ and $b^2$ serve in this case for the group control and the brushes $b^3$ for the transfer of the perforation data to the printing mechanism. The analysis of all columns is effected simultaneously and that of the various positions one after the other. If the two cards under the analyzing brushes $b^1$ and $b^2$ of a column have the same group number, current will flow from negative through the brush $b^1$, the contact $u_I$, $g_I$, through the group control relay G, the contact $g_{II}$, the brush $b^2$ to positive. The group control relays G of the columns being in agreement will respond and each of them actuates its contacts $g_I$, $g_{II}$ and $g_{III}$. By means of the contacts $g_I$ and $g_{II}$ a holding circuit will be established through the group control relay G. Current flows from negative through the cam contact $n^3$ which is closed during the analysis, the contact $g_I$, through the relays G, through the contact $g_{II}$ to positive.

Now, if all group control relays G have responded, all contacts will be opened and also the current circuit to the relay H remains interrupted when the cam contact $n^2$ closes. The cam contact $n^2$ is temporarily closed by its cam at the end of a card cycle. At the beginning of the next card cycle the cam contact $n^3$ opens for a short time, thereby interrupting the holding circuit through the group control relays G so that the latter will drop and return to their initial position; then the analysis of the next card can take place.

If, however, a group control relay has not responded, which is the case upon change of the group number, one of the contacts $g_{III}$ will remain closed and the relay H receives current as soon as the cam contact $n^2$ closes. The relay H responds, closes its contact $h_I$ and switches the contacts $h_{II}$. By means of the contact $h_I$ the relay H establishes a holding circuit through the cam contact $n^1$ so that it remains energized when shortly afterwards the cam contact $n^2$ opens again. The cam contact $n^1$ opens temporarily at the end of the analysis of a card before the cam contact $n^2$ is closed. The contacts $h_{II}$ switch the analyzing brushes $b^3$ from the plug places *p* upon the plug places *s*. After this displacement printing of the item card takes place. The relay H will now remain energized during the next card cycle. If the same has finished, the contact $n^1$ opens for a short time, thereby interrupting the holding circuit through the relay H and causing the latter to drop.

In the meantime the two subsequent cards have been analyzed by the brushes $b^1$ and $b^2$ and it has been determined whether the two group numbers are alike. Accordingly, the contacts $g_{III}$ have been opened. If the two group numbers have been alike all contacts $g_{III}$ are opened and the current circuit to the relay H remains interrupted even if the cam contact $n^2$ closes, as has already been described above.

If in the machine only item cards shall be copied and if no rearrangement shall take place, but if the group control shall be effective, the contact $u_I$ is shifted and simultaneously therewith the contact $u_{II}$ are opened manually by a common key. The brushes $b^1$ are disconnected from the group control by means of the contact $u_I$ and the brushes $b^3$ are connected thereto. The contact $u_{II}$ interrupts the current circuit to the relay H so that the same cannot be energized and no rearrangement can take place. The group control can then be employed in other controlling operations of a known type, which need not be described herein.

I claim:

1. In a printing machine controlled by record cards having arranged in card columns data representing index marks and associated group designation index marks, in combination, feeding means for feeding said cards automatically one by one through the machine; data analyzing means and group analyzing means for the index mark bearing columns of said cards; a printing mechanism consisting of a plurality of printing units, each printing unit being adapted to be controlled by a card column, said printing mechanism including printing units being connected to and actuated by said data analyzing means analyzing the data representing index marks; a group control mechanism controlled by said group analyzing means analyzing the group designation index marks; and shifting means actuated by said group control mechanism upon a change in the group designation marks of subsequent cards to connect to said data analyzing means different printing units when the last card of a group passes said data analyzing means than when the preceding cards of the same group pass through said data analyzing means.

2. In a printing machine controlled by record cards having arranged in card columns data representing index marks and associated group designation index marks, in combination, feeding means for feeding said cards automatically one by one through the machine; data analyzing means and group analyzing means for the index mark bearing columns of said cards; a printing mechanism consisting of a plurality of printing units, each printing unit being adapted to be controlled by a card column, said printing mechanism including printing units being connected to and actuated by said data analyzing means analyzing the data representing index marks; a group control mechanism controlled by said group analyzing means analyzing the group designation index marks; and shifting means actuated by said group control mechanism upon a change in the group designation marks of subsequent cards to connect the same printing units of said printing mechanism to different data analyzing means when the last card of a group passes said data analyzing means than when the preceding cards of the same group pass through said analyzing means.

3. In a printing machine controlled by record cards having index marks provided in card columns and including group designation index marks, in combination, a printing mechanism including a plurality of printing units, each printing unit adapted to be controlled and actuated by the index marks in a card column; means for feeding said cards one by one through the machine; analyzing means for sensing said index marks in said card column; two sets of connections between said analyzing means and said printing units, only one of said sets being operative at one time, and each set of connections establishing, when operative, a selective association of said analyzing means with said printing units different from the association of the other set of connections; an automatic group control mechanism controlled by said group designations in said cards and being actuated by a change in said group designation marks in subsequent cards; and shifting means actuated by said group control mechanism when the same is actuated and rendering said other set of connections operative when the last card of a group passes said analyzing means.

4. In a printing machine controlled by record cards having index marks provided in card columns and including group designation index marks, in combination, a printing mechanism including a plurality of printing units, each printing unit adapted to be controlled and actuated by the index marks in a card column; means for feeding said cards one by one through the machine; analyzing means for sensing said index marks in said card columns, said analyzing means including three rows of analyzers, each row of analyzers adapted to analyze simultaneously all columns of a card, said rows of analyzers being spaced apart in the feeding direction of the cards so as to analyze associated index marks simultaneously in three subsequent cards; two sets of connections between said printing units and the third row of analyzers in the feeding direction, only one of said sets being operative at one time, and each set establishing, when operative, a selective association of said analyzing means with said printing units different from the association of the other set of connections; an automatic group control mechanism controlled by the analyzers in the first two rows of analyzers in the feeding direction of the cards in accordance with the group designation marks of two subsequent cards; and shifting means actuated by said group control mechanism when the same is actuated and rendering the other set of connections operative when the last card of a group passes said analyzing means.

5. In a printing machine controlled by record cards having index marks provided in card columns and including data representing index marks and group designation index marks, in combination, data analyzing means and group analyzing means for the index marks bearing columns of said cards; a printing mechanism including a plurality of printing units, each printing unit being connected to and actuated by said data analyzing means analyzing the data representing index marks in a card column; means for feeding said cards one by one through the machine; an automatic group control mechanism controlled by said group analyzing means analyzing said group designation index marks in said record cards and being actuated by a change of said group designation index marks in subsequently fed cards; shifting means actuated by said group control mechanism when the same is actuated, and connecting to said data analyzing means different printing units of said printing mechanism upon passage of the last card of a group than during passage of the preceding cards of the same group; and manually operated means operatively connecting said group control mechanism and said shifting means and being movable into a position for disconnecting said shifting means and for effecting control of the printing units from the same card columns of all cards of the group of cards.

6. In a printing machine controlled by record cards having index marks provided in card columns and including data representing index marks and group designation index marks, in combination, data analyzing means and group analyzing means for the index marks bearing columns of said cards; a printing mechanism including a plurality of printing units, each printing unit being connected to and actuated by said data analyzing means analyzing the data representing index marks in a card column; means for feeding said cards one by one through the machine; an automatic group control mechanism controlled by said group analyzing means analyzing said group designation index marks in said record cards and being actuated by a change of said group designation index marks in subsequently fed cards; shifting means actuated by said group control mechanism when the same is actuated and connecting upon the passage of the last card of a group said data analyzing means to different columns than upon the passage of the preceding cards of the same group, and manually operated means operatively connecting said group control mechanism and said shifting means and being movable into a position for disconnecting said shifting means and for effecting control of the printing units from the same card columns of all cards of the group of cards.

7. In a printing machine controlled by record cards having index marks provided in card columns and including data representing index marks and group designation index marks, in combination, data analyzing means and group analyzing means for the index marks bearing columns of said cards; a printing mechanism including a plurality of printing units, each printing unit being connected to and actuated by said data analyzing means analyzing the data representing index marks in a card column; means for feeding said cards one by one through the machine; selecting means for selectively associating through said analyzing means said printing units with the card columns; an automatic group control mechanism controlled by said group analyzing means analyzing said group designation marks in said cards and being actuated by a change of said group designation marks in subsequent cards; shifting means connected to said selecting means for changing the association of said printing units with said card columns, said shifting means being actuated by said group control mechanism when the same is actuated during the passage of the last card of a group of cards having the same group designation marks; and manually operated means operatively connecting said group control mechanism and said shifting means and being movable into a position for disconnecting said shifting means and for effecting control of the printing units from the same card columns of all cards of the group of cards.

8. In a card controlled printing machine, in combination, feeding means for feeding record cards having group designation marks arranged in one column and data marks arranged in data columns; a printing mechanism including a plurality of printing units; group analyzer means for analyzing said one column of two subsequently fed cards; a group control mechanism connected to said group analyzer means and being actuated when the same senses different group designation marks in two subsequently fed cards; data analyzer means for analyzing said data columns; shiftable actuating means for selectively connecting said data analyzer means with said printing units, said shiftable actuating means being connected to said group control mechanism and being shifted by the actuated group control mechanism so as to selectively associate said printing units with said data columns.

9. In a card controlled printing machine, in combination, feeding means for feeding record cards having group designation marks arranged in one column and data marks arranged in data columns; a printing mechanism including a plurality of printing units; group analyzer means for analyzing said one column of two subsequently fed cards; a group control mechanism connected to said group analyzer means and being actuated when the same senses different group designation marks in two subsequently fed cards; data analyzer means for analyzing said data columns; shiftable actuating means for selectively connecting said data analyzer means with said printing units, said shiftable actuating means being connected to said group control mechanism and being shifted by the actuated group control mechanism so as to associate different printing units with said data columns when the last card of the group passes through said group analyzer means.

10. In a card controlled printing machine, in combination, feeding means for feeding record cards having group designation marks arranged in one column and data marks arranged in data columns; a printing mechanism including a plurality of printing units; group analyzer means for analyzing said one column of two subsequently fed cards; a group control mechanism connected to said group analyzer means and being actuated when the same senses different group designation marks in two subsequently fed cards; data analyzer means for analyzing said data columns; shiftable actuating means for selectively connecting said data analyzer means with said printing units, said shiftable actuating means being connected to said group control mechanism and being shifted by the actuated group control mechanism so as to associate said printing units with different data columns when the last card of a group passes through said group analyzer means than when the preceding cards of a group pass through said group analyzer means.

References Cited in the file of this patent

UNITED STATES PATENTS

| | | |
|---|---|---|
| 1,909,548 | Pierce | May 16, 1933 |
| 2,053,063 | Bryce | Sept. 1, 1936 |
| 2,131,919 | Mills | Oct. 4, 1938 |
| 2,555,732 | Dayger | June 5, 1951 |